Figure 1:
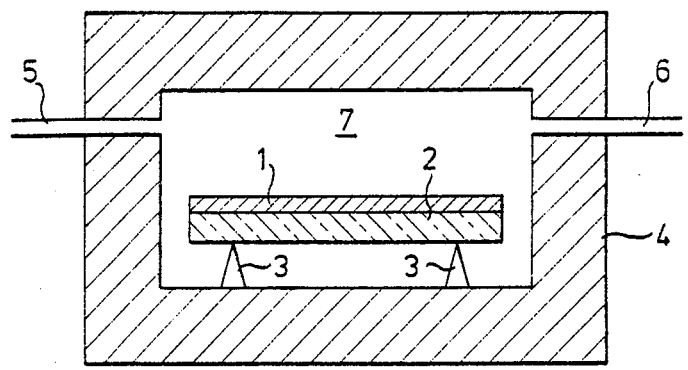

United States Patent [19]

Nolte et al.

[11] 4,304,052

[45] Dec. 8, 1981

[54] DRYING INTUMESCENT MATERIAL

[75] Inventors: Hans-Henning Nolte; Werner Brosker, both of Gelsenkirchen; Werner Janning, Bochum, all of Fed. Rep. of Germany; Marcel De Boel, Chatelineau, Belgium

[73] Assignee: BFG Glassgroup, Paris, France

[21] Appl. No.: 133,950

[22] Filed: Mar. 25, 1980

[30] Foreign Application Priority Data

Apr. 5, 1979 [GB] United Kingdom ............... 12060/79

[51] Int. Cl.$^3$ ................................................ F26B 3/04
[52] U.S. Cl. ..................................... 34/36; 106/18.12; 52/515; 156/313; 252/62; 428/920; 428/921; 427/372.2
[58] Field of Search ............. 106/18, 16, 18.12, 18.35; 52/515; 156/313; 252/62; 428/144, 426, 428, 913, 920, 921; 427/372.2; 34/36, 37

[56] References Cited

U.S. PATENT DOCUMENTS

| | | | |
|---|---|---|---|
| 3,915,777 | 10/1975 | Kaplan | 428/121 |
| 3,934,066 | 1/1976 | Murch | 428/248 |
| 4,190,698 | 2/1980 | De Boel | 428/334 |
| 4,234,639 | 11/1980 | Graham | 428/308 |

FOREIGN PATENT DOCUMENTS

| | | |
|---|---|---|
| 2321575 | 3/1977 | France . |
| 2359943 | 2/1978 | France . |
| 1562792 | 3/1980 | United Kingdom . |

*Primary Examiner*—Larry I. Schwartz
*Attorney, Agent, or Firm*—Cushman, Darby & Cushman

[57] ABSTRACT

When water is removed from a body of wet intumescent material by heating it for a period of time during which water is allowed to evaporate, microbubbles tend to form in the resulting body during the later stages of drying and/or during aging of the body.

In order to reduce this tendency, during at least a part of the heating period there is introduced into the atmosphere in contact with the intumescent material one or more gases which is less soluble in the intumescent material than is oxygen, and/or one or more gases which is the vapor phase of a solvent for the body. The most preferred solvent vapor is steam, and preferred less soluble gases include $SF_6$, $CF_4$, $N_2$ and cyclohexane.

23 Claims, 2 Drawing Figures

DRYING INTUMESCENT MATERIAL

This invention relates to a method of removing water from a body of wet intumescent material by heating it for a period of time during which water is allowed to evaporate.

Bodies of intumescent material are useful for various purposes, and one particular use is in the field of fire screening glazing panels in which a layer of the intumescent material is sandwiched between two transparent sheets. When used in this way, the body of intumescent material should be of high transparency when it is incorporated in the panel.

High quality layers of intumescent material are usually formed from an aqueous solution or suspension of the intumescent material, water being caused or allowed to evaporate in order to form a solid layer.

One problem which is encountered in the formation of high quality layers of intumescent material is the appearance of microbubbles in the layer due to the presence of air which had been dissolved in the solution from which the layer was formed. Such microbubbles often appear during the later stages of the drying period, and their population tends to increase as the panel ages, even after drying has been completed. These microbubbles tend to gather and coalesce so that the resulting larger bubbles are visible to the naked eye. This is clearly objectionable in a high quality layer.

It is a principal object of the present invention to reduce or eliminate the formation of such microbubbles.

According to the present invention, there is provided a method of removing water from a body of wet intumescent material by heating it for a period of time during which water is allowed to evaporate, characterised in that, during at least part of the heating period there is introduced into the atmosphere in contact with the intumescent material one or more gases which is less soluble in the intumescent material than is oxygen, and/or one or more gases which is the vapour phase of a solvent for the body.

The presence of air which could give rise to the formation of microbubbles in the body of dried intumescent material can be attributed to a number of causes:
  (i) air may be present in the water originally used to make up the solution or suspension from which the body is formed
  (ii) air may be introduced by agitation during mixing of the solution or suspension
  (iii) air may be introduced by agitation during pouring of the solution or suspension
  (iv) air may diffuse into the body as it stands waiting to be dried, and
  (v) air may be introduced into the solution or suspension during the drying process itself.

Operation in accordance with the invention directly reduces or eliminates the introduction of atmospheric gases during the drying process and assists in the removal of atmospheric gases introduced at a previous stage.

In fact, the exact composition of the gas or gases in the microbubbles is not known with precision. It is believed that the presence of these microbubbles is in the main due to contacting of the intumescent material with atmospheric oxygen: the introduction of a said less soluble gas or such a solvent vapour has the effect of reducing the proportion of oxygen in the atmosphere in contact with the intumescent material body during drying: reducing the proportion of oxygen in the atmosphere in contact with the body during drying promotes migration of oxygen from the body to the atmosphere, and reduces the migration of oxygen in the opposite direction. Whether or not this theory is correct, the fact remains that operating in accordance with the invention reduces and in some cases even eliminates the appearance of microbubbles in the dried intumescent body. In fact, when using a said less soluble gas it is possible that small quantities of it will dissolve in the body, and microbubbles of that gas may appear during aging of the dried body. However, because of the smaller quantity of gas dissolved in the body, such microbubbles as may appear will be smaller in size and number and will not have such an adverse effect on the optical quality of the body. When using a said solvent vapour, either alone or in combination with a said less soluble gas, such solvent as may migrate into the body can be driven off by the drying process, and in any event, its presence would not lead to microbubbles.

It is especially preferred that the atmosphere in contact with the body during drying should consist substantially wholly of at least one such less soluble gas with optional additions of at least one said solvent vapour, since this will ensure that substantially no air is in contact with the body during the drying period.

The introduction of the vapour phase of a solvent for the body into the atmosphere in contact with the body, as is preferred, might be thought to have an adverse effect on the drying period required. This is not necessarily the case, and indeed when water vapour is introduced into that atmosphere as is most preferred, the drying time can actually be reduced which is highly advantageous for series production.

Wet steam is included in the expression "water vapour" as used in this specification.

When water is driven off by heating a body of intumescent material in a dry atmosphere, there is a very steep gradient in the relative humidity of the atmosphere in the immediate vicinity of the surface of the body, and this leads to evaporation from the surface of the body at a rate which is often quicker than that at which water can migrate to the surface from the depths of the body. This leads to the formation of a crust on the surface which inhibits further evaporation and thus further drying. Such a crust also has an adverse effect on the optical quality of the dried body. By drying the body in a relatively humid atmosphere as is preferred, the tendency for such a crust to form can be reduced or eliminated. For drying at any given temperature, the rate of evaporation is reduced as the relative humidity in the atmosphere rises, and thus drying proceeds move uniformly through the thickness of the body. This in turn means that more heat can be applied to the body so that drying proceeds more quickly.

Preferably, water vapour is introduced into said atmosphere in an amount sufficient to maintain its relative humidity at at least 50%, and a said less soluble gas is also introduced into said atmosphere.

Preferably, the relative humidity of the atmosphere in contact with the body of intumescent material during drying thereof is maintained at at least 80%.

Advantageously water vapour is introduced from a source which is external of an enclosure in which the body is heated, since this makes the amount introduced easier to control.

Preferably said water vapour is introduced at least within the period during which the temperature of the body is being increased. This has further beneficial effects on the transparency of the body thus formed.

Preferably the introduction of water vapour commences substantially simultaneously with the subjection of the body of intumescent material to heat, and advantageously it continues at least until the end of the period during which the temperature of the body is being increased. These features each contribute to a reduction in the tendency for a crust to form.

In the most preferred embodiments of the invention, the temperature of the body is maintained at an elevated level prior to cooling and the introduction of water vapour takes place at least throughout this period, and indeed, in some embodiments of the invention, the introduction of water vapour takes place through the drying period from the commencement of heating at least until the body is allowed to begin to cool.

Advantageously, said body is heated to a temperature of at least 50° C. and optimally to a temperature of at least 75° C. By heating to such an extent rapid drying is promoted. Furthermore there will be an increase in the speed of migration of water molecules from the depth of the body to its surface so that the drying will be more uniform. In fact, by heating the body to a temperature in excess of 90° C., gases can be driven out of solution while the solution is sufficiently fluid to allow the microbubbles thus formed to escape.

It should of course be borne in mind that the body must not be heated so that the water therein boils, since this will give rise to optical defects in the body and may cause premature intumescence of the material used.

Accordingly, in embodiments of the invention in which the body is heated to 100° C. or above, such heating is performed in an autoclave at a super-atmospheric pressure and the difference between that pressure and the partial pressure of water vapour in the atmosphere in the autoclave is at most 500 mm Hg. The partial pressure of water vapour in the autoclave atmosphere should not be much less than the pressure of that atmosphere, though it must of course be below the vapour pressure of the body of wet intumescent material in order to allow drying.

Preferably $SF_6$ is used as the or a said less soluble gas. $CF_4$, $N_2$ and cyclohexane are other suitable gases.

If the surface quality of the body (that is, crust formation) is of only marginal importance, then it is possible in accordance with the invention to rely only on the introduction of a said less soluble gas. This is especially the case when working at lower temperatures where the problem of crust formation is not acute.

In order further to reduce the amount of air in the solution prior to drying, it is preferred to adopt one or more of the following three optional features:
  (i) to make up the wet intumescent material using de-aerated water
  (ii) to subject the wet intumescent material to heat and/or low pressure conditions during or after mixing
  (iii) to pour the wet intumescent material to form the body under low pressure conditions.

Of these features, the third gives perhaps the best results.

Advantageously, water is removed from said body to leave a thin layer, e.g. 8 mm or less, preferably 5 mm or less and optimally 3 mm or less in thickness, and preferably it is at least 0.5 mm in thickness. Such layers can provide very efficient fire screening barriers while being transparent prior to the outbreak of fire.

The present invention may be applied to the drying of various intumescent materials, but we have in view particularly the drying of intumescent materials comprising a hydrated metal salt, especially a hydrated salt of aluminium or an alkali metal. Examples of suitable salts are as follows:
  Aluminates, e.g. Sodium or Potassium Aluminate
  Plumbates, e.g. Sodium or Potassium Plumbate
  Stannates, e.g. Sodium or Potassium Stannate
  Alums, e.g. Sodium Aluminium Sulphate or Potassium Aluminium Sulphate
  Borates, e.g. Sodium Borate
  Phosphates, e.g. Sodium Orthophosphates, Potassium Orthophosphates and Aluminium Phosphate.

Special mention is made of hydrated alkali metal silicates which are the most preferred intumescent materials.

Such materials have very good properties for the purpose in view. They are in many cases capable of forming light transmitting layers which adhere well to glass or vitrocrystalline material. On being sufficiently heated, the combined water boils and the layer(s) foam, so that the hydrated metal salt becomes converted into an opaque porous body which is highly thermally insulating and remains adherent to the glass or vitrocrystalline material.

This feature is particularly important, since even if all the structural plies of the panel are cracked or broken by thermal shock, the panel may retain its effectiveness as a barrier against heat and fumes since the fragments of the plies may remain in position bonded together by the converted metal salt.

Preferably said alkali metal silicate is sodium silicate. Sodium silicate has the further advantage of being relatively inexpensive.

The invention extends to a dried body of intumescent material formed by a method as herein defined.

The invention includes a method of manufacturing a light transmitting fire screening panel comprising forming a layer of intumescent material by a method as herein defined and sandwiching such layer between two light transmitting sheets.

The invention also includes a light transmitting fire-screening panel which incorporates a layer of intumescent material which has been formed by a method as herein defined.

Figure 2:
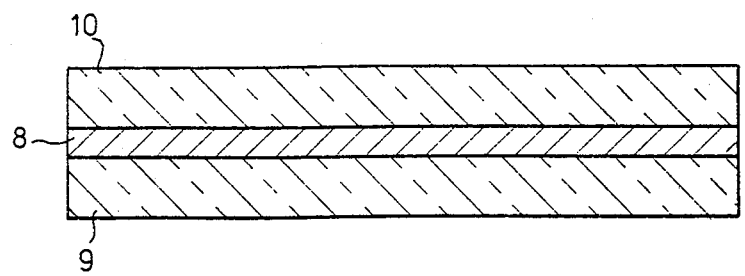

Preferred embodiments of the invention will now be described by way of example with reference to the accompanying diagrammatic drawings in which:

FIG. 1 is a diagrammatic vertical sectional view of a treatment chamber in which a layer of alkali metal silicate is being dried on a support, and FIG. 2 is a sectional view of a light transmitting fire screening panel incorporating such a layer of alkali metal silicate.

In FIG. 1, a layer 1 of wet alkali metal silicate is carried by a supporting sheet 2 in turn supported by legs 3 in a drying chamber 4. A gas inlet pipe 5 and an outlet pipe 6 communicate with the interior 7 of the drying chamber, so that it can be flushed after insertion of the silicate layer 1 and before and/or during drying with one or more gases which is or are less soluble in the silicate layer than is oxygen and/or with the vapour phase of one or more solvents for the layer. If desired the inlet and outlet pipes 5, 6 may form part of a closed circuit (not shown) comprising a circulating pump, one or more gas reservoirs, means for controlling the gas/vapour mixture, and/or heating means. If the gas or mixture flowing through the inlet pipe 5 is unheated, then the chamber 4 must be, for example by heating elements (not shown) located within its walls or in its interior 7. In some embodiments of the invention gas or mixture circulation is maintained throughout the drying period, and in other embodiments such circulation ceases as soon as a desired atmosphere has been introduced into the drying chamber. In variant embodiments, such circulation means is absent, the layer and its support merely being inserted into a drying chamber in which the desired atmosphere subsists.

The support 2 for the silicate layer 1 may be and preferably is constituted by a transparent sheet of a glazing panel in which it is to be incorporated.

FIG. 2 shows a layer of hydrated alkali metal silicate which has been dried by a method according to the invention while supported by a glass sheet 9. The drying process caused the layer 8 and sheet 9 to bond together. A second glass sheet 10 is laid over the silicate layer 8 so that the layer is sandwiched. This sandwich assembly may simply be placed in a frame (not shown), but preferably it is bonded together to form a laminate in any convenient way. The optimum thickness of the layer 8 will depend on the circumstances of use. A layer as thin as 0.1 mm can provide a satisfactory barrier against low temperature fires. If a greater degree of fire protection is required, the layer may be made thicker, but increasing the thickness will result in an increase in the amount of light which will be absorbed by the layer. The best compromise is usually to be found in a thickness range of from 0.5 mm to 3 mm. If desired, the drying chamber 4 may be constituted as an autoclave for drying at elevated pressures.

Prior art process

A solution of hydrated sodium silicate is poured to the required thickness onto a horizontal glass sheet which is then allowed to dry in a room maintained at 28° to 30° C.

It was found that operating at higher temperatures led to a risk of crust formation on the surface of the silicate layer as it dried.

The solution used had the following properties.
Weight Ratio: $SiO_2:Na_2O = 3.4:1$
Density: $= 37°-40°$ Baume
Viscosity: $= 0.2$ Pa s Over the drying period, the relative humidity in the room averaged approximately 50%. The layer was dried for a period of 44 hours until it had a residual water content of between 30 and 35% by weight. The dried layer was 1.2 mm thick.

On inspection the layer was found to contain microbubbles having diameters in the range 0.1 to 0.8 mm.

EXAMPLE 1

The same solution of hydrated sodium silicate was poured under the same conditions to form a layer of the same thickness. The layer was then dried in a drying chamber for a period of 24 hours until it had a similar residual water content. The drying chamber was maintained at 50° C. and its internal atmosphere was made up of $SF_6$ with a relative humidity of 50%.

The layer was incorporated in a panel and subjected to an accelerated aging test by maintaining it at a temperature of 70° C.

On inspection of the layer before and after the aging test, a complete absence of microbubbles was observed. After aging however a slight turbidity of the layer was noticed which on examination at high ($\times 500$) magnification proved to be due to clouds of microscopic bubbles. The total volume of these bubbles was about 1/100 of that found on using the prior art process outlined above. It is believed that this turbidity is due to the dissolving and subsequent evolution of $SF_6$.

In a variant of this Example, $CF_4$ was used instead of $SF_6$. Similar results were achieved.

EXAMPLE 2

A sodium silicate layer of the same thickness was formed in the same way as in Example 1 and was then dried to the same extent for 18 hours in a chamber filled with air at 95° C. and 85% relative humidity. No crust was formed on the surface of the layer because of the high relative humidity, and because of the high temperature and the reduced partial pressure of air due to the high relative humidity, almost all the air dissolved in the layer was driven off during drying.

After drying, no microbubbles or turbidity were observed.

After being subjected to the same aging test, the panel was again inspected and no turbidity was observed. Isolated microbubbles were however seen but these were very much smaller and fewer than those observed after drying by the prior art process. The total incidence of bubbles observed was about 1/100 of that observed after drying by the prior art process.

EXAMPLE 3

A sodium silicate layer of the same thickness was formed in the same way as in the previous Examples, and was then dried to the same extent for 18 hours in a chamber filled with $SF_6$ at 95° C. and 85% relative humidity.

The layer was inspected before and after the same aging test, and no crusting, microbubbles or turbidity were observed.

Comparing this Example with Example 1, because of the much higher partial pressure of water vapour in the atmosphere in contact with the layer during drying, the partial pressure of $SF_6$ is reduced so that it does not dissolve to saturation level in the silicate layer. Thus in contrast to the case of Example 1, there is no excess of $SF_6$ to be driven out of the layer on aging. Any $SF_6$ present in the layer can remain dissolved in it.

EXAMPLE 4

A sodium silicate layer of the same thickness was formed in the same way as in the previous Examples and was then dried to the same extent for 3 hours in an autoclave filled with $SF_6$ at 4 bar, 140° C. and with low partial pressure of water.

The layer was then inspected before and after the same aging test.

Because of the high temperature, a very short drying time was achieved, but because of the high temperature, it was necessary to work at elevated pressure in order to avoid premature intumescence or boiling of the layer. As a result of the elevated pressure, more $SF_6$ was dissolved in the layer than was the case when working at normal pressure (see Example 1), so that after the same aging test the amount of turbidity was somewhat greater than that observed in the case of Example 1. Nevertheless this Example represents an improvement over the prior art process outlined above.

EXAMPLE 5

A sodium silicate layer of the same thickness was formed in the same way as in the previous Examples and was then dried for 4 hours in an autoclave filled with a mixture of air and water vapour at 4 bar and 140° C. The partial pressure of the water vapour was 3.4 bar.

The result given by this drying process was, apart from the much shorter drying period, very similar to those given by the process of Example 2.

EXAMPLE 6

In a variant of Example 2, the sodium silicate layer was formed by pouring a solution which had previously been heated to 95° C. at atmospheric pressure to drive off air dissolved therein during the mixing of the solution. It was found that this gave a further reduction in the population of microbubbles observed after aging.

In a variant of this Example, the solution was subjected to a pressure of from 50 to 150 mm Hg while it was maintained at 25° C. to drive off dissolved air. Similar results were achieved.

In a second variant, the solution was heated to 60° C. and subjected to a pressure of 200 mm Hg prior to formation of the layer. Again, the incidence of microbubbles in the dried layer after aging was further reduced.

EXAMPLE 7

In a variant of Example 2, the sodium silicate solution was poured to form the layer in a chamber whose atmosphere was maintained at a pressure of from 50 mm Hg to 150 mm Hg while the temperature of the solution was about 25° C.

This was found to reduce still further the incidence of microbubbles in the dried layer after aging.

EXAMPLE 8

In variants of any of the preceding Examples, one of the following salts in hydrated form is substituted for the hydrated sodium silicate.

Potassium silicate
Sodium aluminate
Potassium aluminate
Sodium plumbate
Potassium plumbate
Sodium stannate
Potassium stannate
Sodium aluminium sulphate
Potassium aluminium sulphate
Sodium borate
Sodium orthophosphates
Potassium orthophosphates
Aluminium phosphate.

We claim:

1. A method of removing water from a body of wet intumescent material which comprises the steps of heating the body of wet intumescent material for a period of time during which water is allowed to evaporate, and introducing during at least a part of the heating period into the atmosphere in contact with the intumescent material a material selected from the group consisting of (1) at least one gas less soluble in the intumescent material than oxygen, (2) at least one gas constituting the vapor phase of a solvent for the body, and (3) a mixture of at least one gas less soluble in the intumescent material than oxygen and at least one gas constituting the vapor phase of a solvent for the body.

2. A method as defined in claim 1 wherein the atmosphere in contact with the body during drying consists essentially of at least one such less soluble gas.

3. A method as defined in claim 1 wherein the atmosphere in contact with the body during drying includes at least one such less soluble gas and at least one solvent vapor added thereto.

4. A method as defined in claim 1 or 3 wherein water vapor is introduced into said atmosphere.

5. A method as defined in claim 4 wherein water vapor is introduced in an amount sufficient to maintain the relative humidity of said atmosphere at at least 50% and a less soluble gas is also introduced into said atmosphere.

6. A method as defined in claim 4 wherein the relative humidity of the atmosphere in contact with the body of intumescent material during drying is maintained at at least 80%.

7. A method as defined in claim 4 wherein the water vapor is introduced from a source which is external of an enclosure in which the body is heated.

8. A method as defined in claim 4 wherein the water vapor is introduced at least within the period during which the temperature of the body is being increased.

9. A method as defined in claim 4 wherein the introduction of water vapor commences substantially simultaneously with the subjection of the body of intumescent material to heat.

10. A method as defined in claim 4 wherein the introduction of water vapor continues at least until the end of the period during which the temperature of the body is being increased.

11. A method as defined in claim 4 wherein the temperature of the body is maintained at an elevated level prior to cooling and the introduction of water vapor takes place at least throughout this period.

12. A method as defined in claim 4 wherein said body is heated to a temperature of at least 50° C. and optimally to a temperature of at least 75° C.

13. A method as defined in claim 12 wherein the body is heated to at least 100° C. and such heating is performed in an autoclave at a super-atmospheric pressure and the difference between that pressure and the partial pressure of water vapor in the atmosphere in the autoclave is at most 500 mm Hg.

14. A method as defined in claim 1, 2 or 3 wherein the less soluble gas is $SF_6$.

15. A method as defined in claim 1, 2 or 3 wherein during or after mixing of the wet intumescent material it is subjected to heat and/or low pressure conditions whereby dissolved air is removed therefrom.

16. A method as defined in claim 1, 2 or 3 wherein the wet intumescent material is poured to form said body under low pressure conditions.

17. A method as defined in claim 3, 4 or 5 wherein water is removed from said body to leave a thin layer of 8 mm or less.

18. A method as defined in claim 17 wherein said thin layer is 5 mm or less.

19. A method as defined in claim 17 wherein said thin layer is 3 mm or less.

20. A method as defined in claim 17 wherein said thin layer is at least 0.5 mm.

21. A method as defined in claim 1, 2 or 3 wherein the intumescent material comprises a hydrated alkali metal silicate.

22. A method as defined in claim 21 wherein said alkali metal silicate is sodium silicate.

23. A dried body of intumescent material formed by a method according to claim 1, 2 or 3.

* * * * *